E. A. HANFF.
MOTOR CONTROL SYSTEM.
APPLICATION FILED DEC. 4, 1913.
1,156,682.
Patented Oct. 12, 1915.
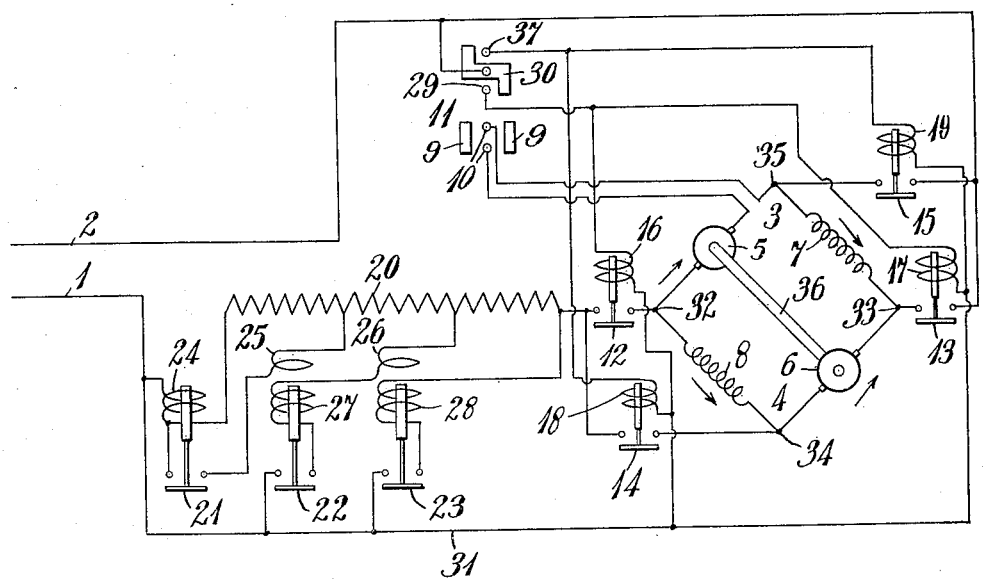

UNITED STATES PATENT OFFICE.

EDWARD A. HANFF, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,156,682.  Specification of Letters Patent.  Patented Oct. 12, 1915.

Application filed December 4, 1913. Serial No. 804,648.

*To all whom it may concern:*

Be it known that I, EDWARD A. HANFF, a citizen of the United States, and a resident of Wilkinsburg, in the county of Allegheny and State of Pennsylvania, have invented a new and useful Improvement in Motor-Control Systems, of which the following is a specification.

My invention relates to motor control systems, and it has for its object to provide a simple arrangement by means of which two series wound motors, which may be operating in parallel relation, may be reversed at will by the employment of a smaller number of switches than has heretofore been necessary.

In the operation of series wound motors in parallel relation, as heretofore arranged, a large number of switches or controller contact members are required to reverse the motors. In some arrangements, as many as eight switches or sets of contact members are necessary to control the direction of rotation of the motors, thus adding materially to the cost of the installation and to the complexity of the system because of the large number of conductors that are required to control the circuits.

I have provided an arrangement by means of which two series-wound motors may be reversed by the use of four switches only, thus greatly simplifying the control system and permitting an economical construction of the same.

In the accompanying drawing, the single figure is a diagrammatic view of circuits and apparatus arranged in accordance with my invention.

Two conductors 1 and 2, which may be connected in any desired manner to a source of direct current, supply energy to two series-wound motors 3 and 4 that are adapted to be connected in parallel relation. The motors 3 and 4 comprise, respectively, armatures indicated at 5 and 6 and series field windings 7 and 8. The terminals of the several armatures and field windings are connected to form a circuit that is controlled by the contact members 9 and 10 of a controller 11. The conductors 1 and 2 are each connected to the above described circuit at the one or the other of two junctions of the terminals, according to the position of electromagnetic switches 12, 13, 14 and 15 that comprise coils 16, 17, 18 and 19, respectively.

The switches 12 and 14 are open and the switches 13 and 15 are closed when the controller 11 is in one running position, and the positions of the several switches are reversed when the controller is in the other running position. In the "off" or inoperative position of the controller 11, all of the switches are open and the conductors 1 and 2 are disconnected from the motors.

A sectional starting resistor 20, which is in series with the positive conductor 1, is controlled by a series of progressively actuated electromagnetic switches 21, 22 and 23 which operate to gradually cut out the resistance of the motor circuits. The switch 21 is provided with a coil 24 and the switches 22 and 23 are respectively provided with coils 25 and 26, each of which is in series with the preceding switch, and with coils 27 and 28, each of which is in series with the switch it controls. The arrangement of the starting resistor and its several controlling switches forms no part of my invention and any other suitable arrangement may be substituted therefor, if desired.

It may be assumed that the controller 11 has been moved to the left to effect the engagement of the contact members 29 and 30 and of contact members 9 and 10. Current then flows from the conductor 1 through a conductor 31, coils 16 and 17, which are connected in parallel, contact members 29 and 30 to the conductor 2. The coils 16 and 17 are energized thereby to close the switches 12 and 13 and complete a circuit from the conductor 1 through the coil 24, resistor 20, switch 12, common terminal 32, series field winding 8 and armature 6 of the motor 4, common terminal 33, and switch 13 to the negative conductor 2. Current also flows from the common terminal 32 through a parallel circuit comprising the armature 5 of the motor 3, contact members 9 and 10 and series field winding 7 to the common terminal 33. Arrows mark the direction of flow of current through the several armatures and field windings of the motors. The motor armatures, which are mechanically connected, as, for example, by a shaft 36, then rotate together. The coil 24 is energized to close the switch 21 and thus complete the circuit of the coil 25 and, at the same time, short circuit one section of the resistor 20. The coil 25 is energized to close the switch 22 and thus complete the circuit of the coils 27 and 26 and thereby short circuit a second section of the resistor 20. The switch 23 is then closed by the coil 26 to complete a short circuit for the entire resistor 20, and the motors are thus gradually accelerated to normal speed.

When it is desired to reverse the motors, the controller 11 is brought to its "off" position to open the circuits of the coils 16 and 17 and thus permit the switches 12 and 13 to open and thereby disconnect the source of current from the motors. The controller contact members 9 and 10 open the circuit comprising the armatures 5 and 6 and the field windings 7 and 8 slightly after the power circuit is broken by the switches 12 and 13, thereby avoiding arcing at the contacts 9 and 10. This circuit is broken in order to prevent current of an excessive value from traversing it in case the normally opposing electromotive forces, that are generated by the motors while they are being brought to rest, should become unbalanced and the magnetism of one motor be reversed. In such a case, the motors would act as generators in series in a circuit of very low resistance and the current might reach a value at which the motors would be damaged. In the majority of applications, however, the contacts 9 and 10 may be omitted, since a circulating current is possible only under certain conditions that may exist only when the motors are connected in one relation. In the employment of this system for such service as hoisting or crane operation, the circulating current may be utilized for braking purposes and thus bring the motors to rest quickly and safely. When the motors are connected to a load, such as a hoist, they would be brought to rest quickly upon the opening of the power circuit and danger from a circulating current would be very small. The contact members 9 and 10 may, therefore, be regarded as a safety device which is necessary only under the conditions above stated.

When the motors have been brought to rest, the controller 11 is moved to the right to effect the engagement of the contact members 30 and 37 and of the contact members 9 and 10. The switches 14 and 15 will then be closed in a manner similar to that described in connection with switches 12 and 13, to connect the conductor 1 to the common terminal 34 through the resistor 20 and to connect the conductor 2 to the common terminal 35. Current will then flow from the conductor 1 through the coil 24, resistor 20, switch 14, common terminal 34, armature 6 of motor 4, field winding 7 of motor 3, common terminal 35 and switch 15 to the conductor 2. Current also flows from the common terminal 34 through a parallel circuit comprising the field winding 8 of the motor 4, the armature 5 of the motor 3, and contact members 9 and 10, to the common terminal 35. Current thus flows in the direction of the arrows through the armatures 5 and 6, but in the reverse direction through the field windings 7 and 8. As is well known, a series wound motor may be reversed by reversing the connections of either its armature or its field winding. Consequently, the motors 3 and 4 will rotate in the direction opposite to that in the above described operation, since the connections of the respective field windings 7 and 8 have been reversed. The resistor 20 will be short circuited in the manner described above.

I claim as my invention:

1. In a motor control system, the combination with a source of current, of a circuit comprising a plurality of motors, of means for connecting said source to said circuit at a plurality of corresponding points to rotate said motors in one direction and for connecting said source to said circuit at other corresponding points to rotate the motors in the reverse direction.

2. In a motor control system, the combination with a source of current, of a circuit comprising the armatures and the field windings of a plurality of series-wound motors, and means for successively connecting the terminals of said source to pairs of corresponding points in said circuit to form similar parallel branches.

3. In a motor control system, the combination with a source of current, of a circuit comprising the armatures and field windings of a plurality of series-wound motors, and means for connecting each terminal of said source to either terminal of one of said field windings.

4. In a motor control system, the combination with a source of current, of a plurality of similar circuits connected in parallel relation to said source, each of said circuits comprising a series-wound motor, and means for reversing the flow of current through a corresponding portion of each of said circuits.

5. In a motor control system, the combination with a source of current, of a circuit comprising two series-wound motors having armatures and field windings, and means for successively connecting said source to the terminals of each of said motors and then connecting said source to said circuit intermediate the armature and the field winding of each motor.

6. In a motor control system, the combination with a source of current, of a circuit comprising two series-wound motors each having an armature and a field winding, and means for connecting said source to said circuit to produce two parallel circuits each comprising the armature and the field winding of the same motor and for connecting said source to said circuit to form two parallel circuits each comprising the armature of one motor and the field winding of the other motor.

7. In a motor control system, the combination with a source of current, and a pair of parallel circuits connected thereto, each comprising the armature and field magnet windings of an electric motor, of means for rearranging said circuits to reverse the connections of each of said field magnet windings.

In testimony whereof, I have hereunto subscribed my name this 25th day of Nov. 1913.

EDWARD A. HANFF.

Witnesses:
B. B. HINES,
CHARLES H. HODGKINS.

Copies of this patent may be obtained for five cents each, by addressing the "Commissioner of Patents. Washington, D. C."